Figure 1:
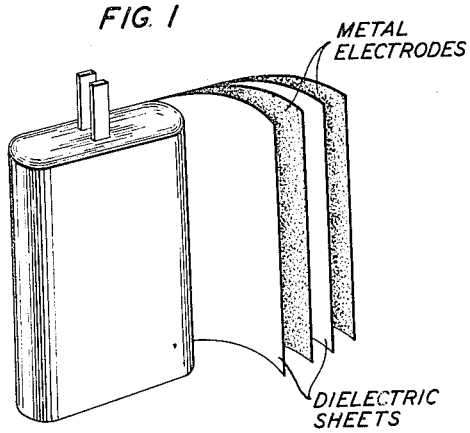

June 23, 1942.   L. EGERTON   2,287,421
STABILIZATION OF HALOGENATED COMPOUNDS
Filed Nov. 14, 1940

METAL ELECTRODES

DIELECTRIC SHEETS

DIELECTRIC CONTAINING HALOGENATED COMPOUND AND SULPHUR OR SELENIUM

METAL ELECTRODES

INVENTOR
L. EGERTON
BY
ATTORNEY

Patented June 23, 1942

2,287,421

UNITED STATES PATENT OFFICE 2,287,421

STABILIZATION OF HALOGENATED COMPOUNDS

Lawson Egerton, Summit, N. J., assignor to Bell Telephone Laboratories, Incorporated, New York, N. Y., a corporation of New York Application November 14, 1940, Serial No. 365,635

16 Claims. (Cl. 175—41)

The present invention relates to compositions of matter comprising halogen-containing organic substances which are treated to render them non-corrosive of metals, and to apparatus, more particularly electrical apparatus, such as electrical condensers, in which such treated halogen-containing organic substances are maintained in contact with metal.

It is an object of the present invention to prolong the life of electrical capacitors which employ, in contact with metal armatures, dielectrics containing organic substances which possess halogen atoms within their molecules, and to stabilize such capacitors so that their dielectrics retain more uniform values of leakage current and power factor.

It is a more general object of the present invention to treat halogen-containing organic substances which are maintained in contact with metal, or are intended to be maintained in contact with metal, so as to render them non-corrosive.

Halogenated aryl compounds and more particularly the halogenated aromatic hydrocarbons, such as chlorinated diphenyl and chlorinated naphthalene, are known to be useful electrical insulating materials because of their relatively high thermal stability, resistance to oxidation, non-inflammability, low conductivity and other valuable properties. Most of the halogenated aromatic hydrocarbons used commercially are made up of polar molecules and therefore possess a high dielectric constant which makes them especially useful in capacitors.

Despite these advantages dielectrics containing such compounds often deteriorate at a faster rate than do the dielectric materials which do not contain halogens, particularly when employed under moderately elevated temperatures, high electrical stress or both. This deterioration may manifest itself in one or more of three ways. The leakage current may rise to an unduly high value or in the case of condensers operating on alternating current the power factor may rise unduly. The deterioration may also result in the complete breakdown of the dielectric within a short time causing a short-circuit of the apparatus.

This deterioration has been found to be associated with a chemical interaction between the metallic elements of the apparatus and the halogenated compounds or their halogen-containing decomposition products.

When the metal in contact with the halogenated compound is aluminum, it is apparently the decomposition products of the halogenated material which interact with the metal. In an electrical capacitor, for instance, having aluminum armatures separated by paper which is impregnated with a halogenated aromatic hydrocarbon such as chlorinated naphthalene or chlorinated diphenyl, it appears that upon the application of an electrical potential, at a moderately elevated temperature, hydrogen chloride and other acid, halogen-containing decomposition products are split off from the chlorinated compound. The hydrogen chloride or halogen ion from other decomposition products appears to attack the aluminum armatures forming aluminum chloride, which is a powerful catalyst for the decomposition of organic compounds. The thus-formed aluminum chloride causes the further decomposition of the chlorinated impregnant, with the production of more halogen-containing decomposition products, which react with the aluminum, forming more aluminum chloride. The cycle is thus continued at an accelerated rate. Both the hydrogen chloride and the aluminum chloride contribute to the decomposition of the paper and also increase local conductivity, causing the generation of heat which accelerates the breakdown of the chlorinated impregnant and which accelerates the electrolysis of the paper. The hydrogen chloride which is split off in the initial decomposition of the chlorinated compound is produced in such small quantities that it would not cause the rapid destruction of the dielectric, but the accelerating action of the aluminum chloride produced by the reaction of the hydrogen chloride with the metal armatures causes relatively rapid deterioration.

In other cases, such as when tin is maintained in contact with the halogenated hydrocarbon, there appears to be a direct reaction between the halogenated substance and the metal without the necessity of the application of an electric field. Thus when an electrical capacitor made up of tin foil armatures separated by paper which is impregnated with a halogenated aromatic hydrocarbon, such as chlorinated naphthalene or chlorinated diphenyl, is heated to moderately elevated temperatures, it shows an initial high power factor. Similar condensers having aluminum electrodes have, by way of contrast, a relatively low initial power factor when heated to moderately elevated temperatures; the power factor increases only after the application of an electrical potential which, as discussed above, is assumed to cause the splitting off of hydrogen chloride from the impregnant. The high initial power factor of the tin foil capacitors obviously results from a direct interaction between the halogenated impregnant and the tin foil armatures at elevated temperatures.

The present invention is based upon the discovery of the fact that the presence of small amounts of sulphur or selenium in halogenated organic compounds used as dielectrics for electrical condensers, particularly those having aluminum or tin armatures, will greatly improve the performance of such condensers presumably because of the action of the sulphur or selenium in forming on the metal armatures thin barrier films of sulphides or selenides which inhibit the above-described interaction between the metal armatures and the halogenated organic compound or its halogen-containing decomposition products. By retarding the interaction between the metal armatures and the halogen-containing decomposition products, the thin barrier films of metal sulphides or selenides interrupt the cycle of deterioration of halogenated condenser dielectrics described above. The initial formation of hydrogen chloride under the influence of the electrical field is not of itself sufficient to cause rapid deterioration in the absence of other harmful reaction products whose formation is induced by the armature metals.

Elemental sulphur is in general very soluble in halogenated aromatic hydrocarbons and other halogenated organic compounds at elevated temperatures, and soluble to the extent of about .25 per cent at room temperatures. Selenium on the other hand is soluble only in small amounts up to about .1 per cent by weight in halogenated aromatics hydrocarbons.

In electrical condensers used in alternating current circuits, the power factor increases fairly rapidly at moderately elevated temperatures due to the deterioration of the halogen-containing dielectric. The addition of sulphur in small amounts, less than about .05 per cent, serves to maintain a lower more uniform value of power factor without substantially extending the life of the condenser. When larger amounts of sulphur between about .1 per cent and about 2 per cent are dissolved in the halogenated compound used in the condenser dielectric, the life of such condensers is materially extended and the direct current conductance is stabilized at a lower more uniform value. When selenium is present in the halogenated organic compounds in the condenser dielectric in amounts up to the limit of its solubility (about .1 per cent) the selenium exerts about the same effect in improving the performance of the condensers as do small amounts of sulphur as described above.

Figure 2:
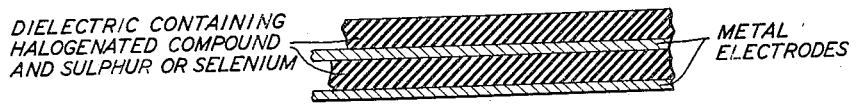

In the drawing:

Fig. 1 represents a simple rolled condenser of the type to which the present invention is applicable; and Fig. 2 shows a sectional view of a portion of the electrodes and dielectric sheets of Fig. 1.

The rolled condenser of Fig. 1 is made up of alternate layers of metal foil such as aluminum or tin foil separated by sheets of dielectric material. Such condensers are commonly prepared by interleaving two dielectric sheets, such as paper, with two sheets of metal foil and rolling the interleaved sheets into the form shown in the drawing. The rolled condenser is then dipped into a suitable medium for impregnating the porous dielectric sheets, such as a halogenated aromatic hydrocarbon. The condenser may then be placed in a protective case or otherwise utilized as desired. Fig. 2 shows a section of one turn of the finished rolled condenser showing the alternate metal electrodes and dielectric layers. According to the present invention the dielectric of the finished condenser contains a halogenated organic compound together with a minor portion of sulphur or selenium.

The sulphur and selenium stabilizers can be most conveniently introduced into the condenser dielectrics by dissolving the desired percentage of the stabilizer in elemental form in the halogenated organic hydrocarbon impregnating compound. The rolled condensers, for example, may be prepared by interleaving any suitable paper, such as linen or kraft paper, between sheets of suitable metal foil, such as aluminum or tin foil, and rolling the interleaved sheets in the conventional manner. The rolled condenser may then be impregnated by a suitable method with a suitable halogenated aromatic compound having dissolved therein a small percentage of elemental sulphur or selenium. As examples of suitable impregnating compounds may be mentioned chlorinated diphenyl containing 1 per cent sulphur by weight, chlorinated naphthalene containing 1 per cent sulphur, chlorinated diphenyl containing .1 per cent selenium and chlorinated naphthalene containing .1 per cent selenium.

Since at least part of the beneficial effect of sulphur and selenium is due to the formation of barrier films on the metal armatures which prevent interaction of halogen-containing compounds with the metal, effects similar to those described above for the addition of small amounts of sulphur and selenium to halogenated organic compounds may be obtained by prior treatment of metal objects, such as condenser armatures, with sulphur vapor, a polysulphide, selenium vapor, hydrogen selenide or other materials capable of forming sulphides or selenides with the metal. Metal so treated is resistant to attack by the halogen containing decomposition products of halogenated aromatic hydrocarbons or similar halogenated organic compounds. Metal foils, such as aluminum or tin foils, so treated may be formed into electrical condensers by the means described above and such condensers may be impregnated with either an unstabilized halogenated aromatic hydrocarbon or a halogenated aromatic hydrocarbon having dissolved therein a small amount of sulphur or selenium. In either case a distinct improvement in the characteristics of the condenser is observable.

The corrosion inhibitors of the present invention may be added in any suitable concentration to the halogenated organic compounds to be stabilized. However, as stated above, the addition of selenium beyond the limit of solubility does not in general produce any better results than smaller concentrations. Therefore the amount of selenium will in general be limited to .1 per cent, or less, of the halogenated organic compounds. As stated above the most desirable results can be obtained with sulphur at concentrations above .1 per cent. However, its full potential effectiveness is not reached at concentrations below about .25 per cent to about 1 per cent. An increase in the concentration of sulphur beyond 1 per cent will usually not result in any substantially increased stabilizing action. Obviously higher concentrations of sulphur may be used, but it may be desirable to limit the amount of sulphur to avoid any excessive corrosive action of the sulphur itself. The most deable concentration of sulphur is usually about [...] per cent. It is obvious that where it is de- [...]able to use an amount of stabilizer in excess [...] that which is soluble in the halogenated im- [...]egnant, the stabilizer may be incorporated di- ctly in the condenser paper prior to formation [...] the condenser.

The effect of inhibitors in electrical capacitors [...]ving halogen-containing dielectrics has been [...]scribed above. It is obvious that these same [...]ibitors will be of value in preventing the cor- [...]sive action of halogenated aromatic compounds [...] other pieces of apparatus and under other con- [...]ions where they are maintained in contact [...]th metals, particularly with aluminum and [...]. Insofar as the same general mechanism of rrosion with resultant acceleration of decom- sition is common to other organic compounds [...]taining halogen atoms, the same inhibitors [...]l be useful for preventing corrosion, as for in- [...]nce in the case of halogenated straight chain phatic hydrocarbons, halogenated alicyclic hy- carbons, halogenated oxygen-containing or- nic compounds and other halogen-containing [...]mpounds which by virtue of their halogen con- [...]t tend to cause corrosion. For this reason [...] addition of a small amount of the above-de- [...]ibed corrosion inhibitors to any of these halo- [...]ated organic compounds intended for techni- [...] uses may be desirable as a precaution against [...] corrosion of metals and the consequent ac- erated decomposition of the halogen-contain- [...] compound.

The invention has been described in terms of specific embodiments but it is to be under- [...]od that it is of broad application and is to be [...]ited only by the scope of the appended claims.

What is claimed is:

.. A halogenated organic compound which by tue of its halogen content tends to corrode me- lic bodies when maintained in contact with m at elevated temperatures and under an elec- [...] potential, said halogenated compound con- [...]ing a small percentage of selenium.

. Chlorinated diphenyl stabilized with a small ount of sulphur, less than about 2 per cent.

. In an article or device wherein a metal is [...]tained in contact with a halogenated aro- [...]ic hydrocarbon, a corrosion inhibitor dis- [...]ed in said halogenated compound, compris- a minor proportion of sulphur.

. In an article or device wherein a metal se- [...]ed from the group consisting of aluminum [...] tin is maintained in contact with a halo- [...]ated organic compound which by virtue of its [...]gen content tends to attack said metal or to [...]n decomposition products which attack said [...]al, a corrosion inhibitor dissolved in said [...]genated organic compound comprising a [...]ll percentage of a substance selected from the [...]p consisting of sulphur and selenium.

. A metal article which is maintained in con- [...] with a halogenated organic compound, said [...]al article having on its surface a thin film of [...]bstance selected from the group consisting of sulphides of said metal and selenides of said metal.

6. A metal article which is maintained in contact with a halogenated organic compound, said article having at least its outer portion formed of a metal selected from the group consisting of aluminum and tin, said outer metal having on its surface a thin film of a substance selected from the group consisting of sulphides of said metal and selenides of said metal.

7. A condenser armature comprising foil of a metal selected from the group consisting of aluminum and tin having on its surface a film of a substance selected from the group consisting of sulphides of said metal and selenides of said metal.

8. An electric condenser comprising metal armatures coated with a substance selected from the group consisting of sulphides of said metal and selenides of said metal and a dielectric therebetween comprising a halogenated organic compound containing a small percentage of a substance selected from the group consisting of sulphur and selenium.

9. An electric condenser comprising metal armatures coated with a substance selected from the group consisting of sulphides of said metal and selenides of said metal and separated by a dielectric comprising a halogenated organic compound.

10. An electric capacitor comprising metal armatures separated by a dielectric comprising a halogenated aromatic hydrocarbon containing a small percentage of sulphur.

11. An electric capacitor comprising armatures formed of a metal selected from the group consisting of aluminum and tin separated by a dielectric comprising a halogenated organic compound containing a small percentage of a substance selected from the group consisting of sulphur and selenium.

12. An electric capacitor comprising metal armatures separated by a dielectric comprising chlorinated diphenyl containing a minor proportion of sulphur.

13. An electric capacitor comprising metal armatures separated by a dielectric comprising chlorinated naphthalene containing a small amount of sulphur less than about 2 per cent.

14. An electric capacitor comprising aluminum armatures separated by a dielectric comprising paper impregnated with chlorinated diphenyl containing a minor portion of sulphur.

15. An electric capacitor comprising aluminum armatures separated by a dielectric comprising paper impregnated with chlorinated naphthalene containing a small amount of sulphur less than about 2 per cent.

16. The method of forming an electric condenser comprising placing a sheet of a porous spacer between metal foil electrodes coated with a substance selected from the group consisting of sulphides of said metal and selenides of said metal and impregnating said porous spacer with a halogenated organic compound.

LAWSON EGERTON.